UNITED STATES PATENT OFFICE.

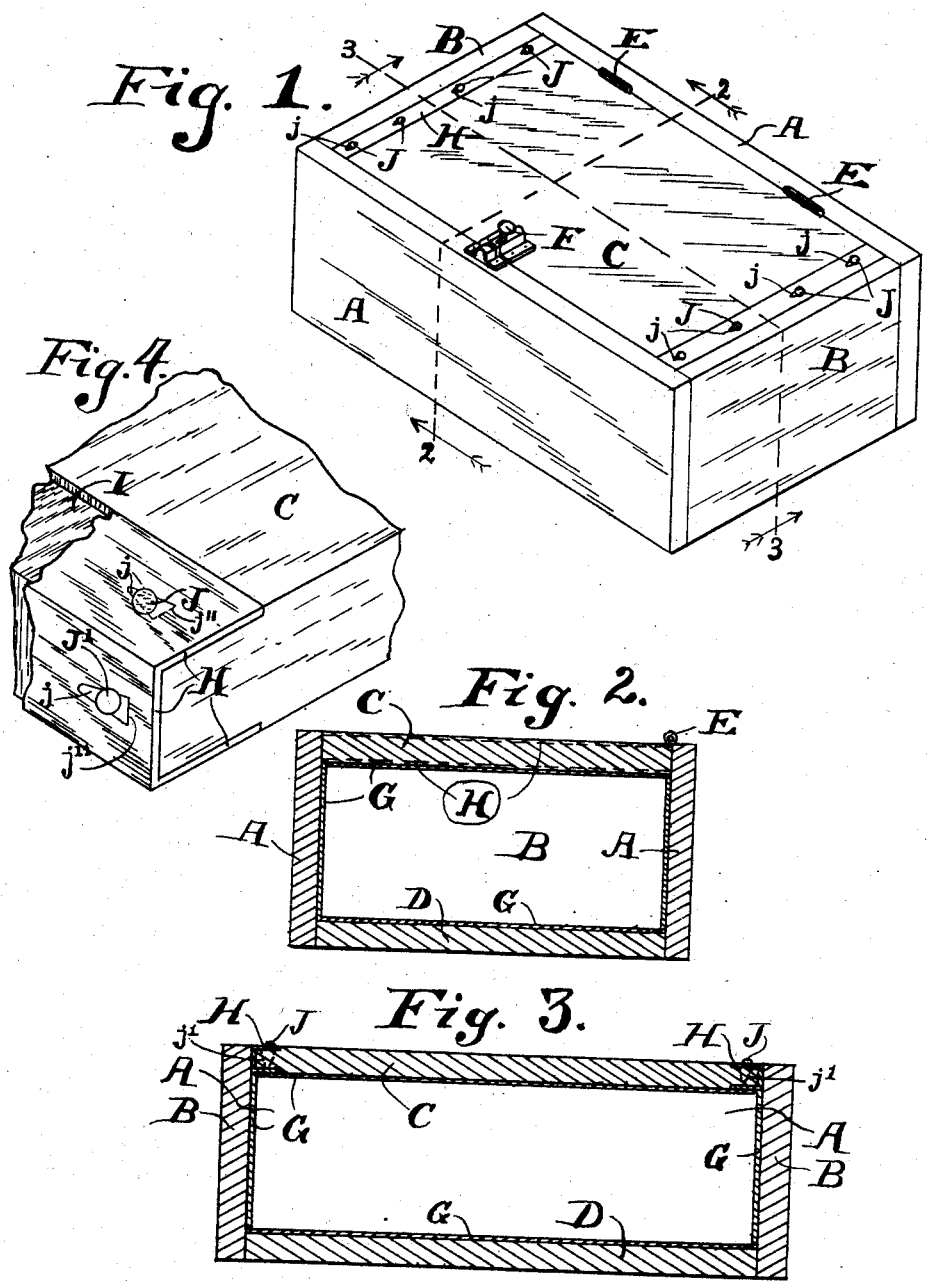

THOMAS Q. ANDRAZYK, OF CHICAGO, ILLINOIS.

CUT-OUT BOX.

No. 901,939.　　　　Specification of Letters Patent.　　　　Patented Oct. 27, 1908.

Application filed July 29, 1907.　Serial No. 386,045.

*To all whom it may concern:*

Be it known that I, THOMAS Q. ANDRAZYK, a citizen of the United States, and a resident of Chicago, in the county of Cook and State of Illinois, have invented certain new and useful Improvements in Cut-Out Boxes, of which the following, when taken in connection with the drawing accompanying and forming a part hereof, is a full and complete description, sufficient to enable those skilled in the art to which it pertains to understand, make, and use the same.

This invention relates to wooden boxes, provided with a hinged cover and designed to be used as storm boxes or for holding electric apparatus as cut-outs, switches and the like. These boxes are at times painted inside with asphaltum paint and at times lined with asbestos, depending on the particular use to which they are to be put. And the object of this invention is to obtain a box which will have a tightly closing cover not liable to warp either to prevent opening or closing or to produce an aperture or crack after the same has been closed. The manner in which I accomplish these objects is to construct the box and so hinge the cover thereto that such cover will shut down between the ends and sides of the box and further to so construct the cover so it will not warp.

I have illustrated a cut-out box embodying this invention in the drawing accompanying and forming a part hereof in which Figure 1 is a perspective of a cut-out box embodying my invention. Fig. 2 is a vertical section on line 2—2 of Fig. 1. Fig. 3 is a vertical section on line 3—3 of Fig. 1, and Fig. 4 is a perspective of one corner of the cover of a cut-out box embodying my invention.

A reference letter applied to designate a given part is used to indicate such part throughout the several figures of the drawing wherever the same appears.

A, A, are the sides and B, B, are the ends of the box.

C is the cover and D is the bottom.

E, E, are the hinges by which the cover C is attached to a side of the box.

F is the latch to the cover.

G, G, is asbestos lining to the box.

H, H, are, respectively, U-shaped sheet metal strips secured in place across the ends of the cover C. The ends of the cover are respectively cut away at I, (see Fig. 4), so that the outer surfaces of the U-shaped strips, will be flush or nearly so with the top and bottom surfaces of the cover C.

J, J, are rivets, nails or bolts extending through the U-shaped metal strips and through the cover holding such strips firmly in position. Rivets J, J, are only required in special cases as for storm cases, or when the boxes are to be exposed to out of doors climatic conditions.

J', J', are nails which I use additional to the metal wedges $j'$ herein after described.

$j, j,$ are triangular openings in the U-shaped metal strip, the metal $j'$ which is forced out to make these openings is preferably left attached to the main body of such U-shaped metal strip on line $j''$ of Fig. 4, and is also driven in the body of the cover. These U-shaped metal strips H, H, are made of sufficiently heavy sheet metal so that when bent up into shape and secured by rivets J, J, or by any other equivalent means to the cover C such cover cannot warp at the ends whether the box be placed in a dry or comparatively damp location. The making of these strips H, H, and securing them in place on the ends of the cover C is an inexpensive operation not adding materially to the cost of the cover C. When the cover is thus made whether this U-shaped strip be painted the same color as the remainder of the cover or not it presents a sightly appearance.

Having thus described my invention what I claim and desire to secure by Letters Patent is;—

The combination of a box and a cover, such box comprising an outer wooden casing lined with asbestos and such cover hinged thereto to shut down between the sides of the box with the upper edges of such sides in substantially the same plane as the upper face of the cover, and such cover consisting of a wooden body part provided with tongues at its ends, in combination with U-shaped metal strips, such strips provided with V-shaped apertures obtained by forcing V-shaped pieces, attached at the respective bases thereof to the body part of the strips, into a plane substantially at right angles with such body part, and fastenings extending through such V-shaped apertures and into the wooden body part of the cover, to attach such U-shaped metal strips in place; substantially as described.

THOMAS Q. ANDRAZYK.

In the presence of—
 MAX LUSTER,
 CHARLES TURNER BROWN.